United States Patent [19]

Kubo et al.

[11] 4,331,477
[45] May 25, 1982

[54] POROUS TITANIUM-ALUMINUM ALLOY AND METHOD FOR PRODUCING THE SAME

[75] Inventors: Yoshimi Kubo; Hitoshi Igarashi, both of Tokyo, Japan

[73] Assignee: Nippon Electric Co., Ltd., Tokyo, Japan

[21] Appl. No.: 82,217

[22] Filed: Oct. 4, 1979

[30] Foreign Application Priority Data

Oct. 4, 1978 [JP] Japan .................................. 53-122885

[51] Int. Cl.³ .............................................. B22F 3/00
[52] U.S. Cl. ........................................ 75/228; 75/222; 428/566
[58] Field of Search ........................ 75/222, 228, 245; 428/566

[56] References Cited

U.S. PATENT DOCUMENTS

| | | | |
|---|---|---|---|
| 3,260,576 | 7/1966 | Gruene et al. | 428/566 |
| 3,407,231 | 10/1968 | Dickinson et al. | 428/566 |
| 3,428,490 | 2/1969 | Bravo et al. | 428/566 |
| 3,599,053 | 8/1971 | Iida et al. | 317/230 |

*Primary Examiner*—Brooks H. Hunt
*Attorney, Agent, or Firm*—Fitzpatrick, Cella, Harper & Scinto

[57] ABSTRACT

A porous, sintered Ti-Al alloy has specific surface area of 0.01–1 $m^2/g$, density of 20–80% of theoretical density and good mechanical strength, suitable for use in capacitor anode bodies, catalyzers, filters, etc. A mixed, press-shaped body of 10–90 atom. % Ti powder and 90–10 atom. % Al powder is processed by a first heat-treatment at 500° to 665° C. for 5 to 60 minutes to make it porous and then by a second heat-treatment at 700° to 1300° C. for 5 to 60 minutes to increase mechanical strength.

18 Claims, No Drawings

POROUS TITANIUM-ALUMINUM ALLOY AND METHOD FOR PRODUCING THE SAME

BACKGROUND OF THE INVENTION

1. Field of the Invention

The present invention relates to a porous Ti-Al alloy which has a large specific surface area and which is suitable for capacitor anode bodies, catalyzers, filters, etc., and also to a method for producing the same.

2. Description of the Prior Art

The use of porous sintered bodies of metal for capacitor anode bodies, catalyzers, fuel filters for aircrafts, etc., is known. In such applications it is necessary for the sintered body to have large specific surface area and porosity and a certain amount of mechanical strength. When used as a capacitor anode body, in addition to the above requirements, it is further necessary for the sintered body to have a valving effect. Aluminum, tantalum, niobium, titanium, etc. are known as metals having such a valving effect.

These valving metals, as for example aluminum, have the disadvantage that when a capacitor anode body is produced by press-shaping the aluminum powder and sintering the shaped body, increasing in the pressing force or the sintering temperature for the purpose of giving the sintered body sufficient mechanical strength to withstand handling during production and utilization, reduces the specific surface area and lowers the capacitance of the resulting capacitor. Such a disadvantage is also true for tantalum, niobium, titanium, etc. A similar problem exists when making a filter from the porous sintered body. For instance, when manufacturing a filter for adsorbing oxygen gas, hydrogen gas, etc., active metals such as aluminum, titanium, etc. are used as metals for effecting the adsorptive reaction, but similarly to the case of the above-described capacitor anode body it is difficult to produce a sintered body consisting of aluminum only or titanium only and yet having a sufficient mechanical strength and a large specific surface area.

German Patent Application No. P 26 36 279.8 published before examination discloses a method for producing a porous anode body for use in a capacitor by mixing and press-shaping tantalum powder and aluminum powder and then heat-treating the press-shaped body of the mixture above the softening temperature of aluminum. However, its description is very brief, and no description is made at all with respect to detailed manufacturing conditions such as, for example, temperature range and period of the heat treatment as well as the characteristics of the produced porous Ta-Al anode body. Moreover, use of tantalum should be avoided, because it is expensive.

On the other hand, Japanese Patent Application No. 51-10165 published before examination discloses a method for producing aluminum-titanium alloy powder. According to its disclosure, mixed powder of aluminum and titanium is press-shaped, and then sintered to form an alloy by heating at a temperature where the press-shaped body partly becomes liquid phase, that is, at a temperature (for instance, 700° ~ 1000° C.) higher than the melting point of aluminum. Once the alloy is formed and thereafter the sintered body is crushed to produce Al-Ti alloy powder. However, the described technique is not specifically intended to produce a porous body, but is merely a method for producing Al-Ti alloy powder.

In general, a sintering process involving a liquid phase tends to result in densification of the porous body due to the surface tension of the liquid and the resultant porous structure is such that the pores tend to be isolated in the body, that is, the sintered body has a low specific surface area, although such a porous body may be easily crushed into a form of powder. Therefore, a Ti-Al sintered body produced according to the teaching of this prior art reference would have a high density and a low specific surface area, so that it has the disadvantage that when it is used as a material for capacitor anode bodies or the like, the capacitance of the produced capacitor is too small.

U.S. Pat. No. 3,599,053 discloses a method for making a porous sintered body of Ti-Al alloy and its application to capacitor. However, a porous sintered body according to this prior art is produced through a lengthy process of forming Ti-Al alloy by a vacuum melting or arc melting of a mixture of Ti powder and Al powder, crushing the Ti-Al alloy into fine particles, press-shaping the Ti-Al alloy powder, and sintering the shaped alloy powder at a temperature of 800° to 1300° C. in a nonoxidizing atmosphere. This process has the following disadvantages: First, the process of making the porous body is very complex because of inclusion of crushing and two heat treatments. Second, when Ti-Al alloys ($TiAl_3$) are crushed into fine particles, Ti is partially exposed at the surface of the crushed $TiAl_3$ particles. With such Ti-exposed surfaces, the sintered body, when used in a capacitor, shows an undesirably large leakage current. In order not to expose Ti at the surface of the sintered body, a lengthy heat treatment is necessary to fully cover the exposed Ti surface with Al of other $TiAl_3$ particles. Third, porous sintered bodies having large specific surface area and small density can not be produced, because the heat treatment is performed at a temperature higher than the melting point of Al.

SUMMARY OF THE INVENTION

It is an object of the present invention to provide a porous Ti-Al alloy which is so porous that it has a large specific surface area and which is suitable for capacitor anode bodies, catalyzers, filters, etc.

Another object of the present invention is to provide a practical method for producing a porous Ti-Al alloy in a less expensive manner.

According to one feature of the present invention, there is provided a porous Ti-Al alloy consisting of titanium and aluminum, which has a density of 20 to 80% of its theoretical density and a specific surface area of 0.01 m²/g or more.

A porous alloy having a specific surface area as large as 0.01 m²/g or more is useful as a material for capacitor anode bodies or catalyzers. However, it cannot be obtained through the methods disclosed in the above-mentioned prior art references, German Patent Application No. P 26 36 279.8, Japanese Patent Application No. 51-10165 and U.S. Pat. No. 3,599,053, but it has been first obtained through the method for producing a porous Ti-Al alloy as described in detail below.

This invention is based on a new finding that a porous sintered body having a large specific surface area can be obtained through heat treatment at a temperature lower than the melting point of aluminum (about 665° C.) but not lower than 500° C. of mixed and press-shaped titanum powder and aluminum powder.

The above-mentioned melting point of aluminum is somewhat different from the melting point of the element aluminum (when existing independently) of 660° C. More particularly, as a mixed shaped body of titanium and aluminum powder is gradually heated starting from a low temperature, aluminum diffuses quickly into surface portions of titanium grains and titanium as well diffuses slowly into surface portions of aluminum grains. Consequently, a melting temperature or melting point of the aluminum grains into which titanium having a higher melting point is diffused rises by about 5° C. with respect to the melting point of pure aluminum of 660° C. Therefore, throughout this specification and the appended claims, the term "melting point of aluminum" is used to mean the temperature at which aluminum melts when heating a mixed shaped body of aluminum and titanium powder (about 665° C.).

It is presumed that the phenomenon of the above-described new finding of this invention is caused for the following reasons. When a mixed shaped body of titanium and aluminum powder is held at a temperature lower than the melting point of aluminum but above 500° C., an alloying reaction proceeds quickly resulting in formation of an intermediate compound phase of $TiAl_3$ and then mutual diffusion between titanium and aluminum proceeds further through this intermediate compound phase, finally reaching an equilibrum phase of titanium and aluminum as indicated in the phase diagram. During this period, in the intermediate compound phase of $TiAl_3$, the diffusion of aluminum is predominant, so that almost only aluminum diffuses into titanium and vacant holes are produced at the locations where aluminum grains have existed initially. As a result, a large specific surface area can be provided.

Titanium and aluminum are both metals having a valving effect, so that the porous Ti-Al alloy according to the present invention also presents a sufficient valving effect, and hence it is very useful as a capacitor anode body.

According to studies of the dielectric properties of the sintered and formed capacitors made of Ta-Al alloys and of Ti-Al alloys produced by the present inventors, the alloying of aluminum to tantalum deteriorates the excellent dielectric properties of a tantalum capacitor. That is, both leakage current and dielectric loss increase substantially with the addition of aluminum. On the contrary, the alloying of aluminum to titanium improves significantly the poor valving effect of titanium, resulting in a new alloy capacitor.

Moreover, a Ti-Al alloy has excellent properties for use as a catalyzer in decomposing nitrogen oxides into nitrogen and oxygen or decomposing methanol. Therefore, through use of a Ti-Al alloy according to the present invention which enables one to greatly increase the contact area between the catalyzer and the gas or liquid to be decomposed that is, (the specific surface area of the catalyzer, the catalyzer) effect becomes extremely efficient.

In addition, with regard to fuel filters in an aircraft, those having less weight are desired. Now the porous Ti-Al alloy according to the present invention has a small net density of $3 \sim 4$ g/cm³ which is less than one-half as heavy as the filters made of stainless steel in the prior art, and with respect to strength per unit weight as well as workability it is also equal to or better than the prior art filters, so that its overall performance is excellent.

As described above, porous Ti-Al alloy is suitable for various utilizations such as capacitor anode bodies, catalyzers, filters, etc., and taking into consideration the charge storage capability of a capacitor and the efficiency of a catalyzer effect, it is desirable to have a large specific surface area and practically it is necessary to have a specific surface area not smaller than 0.01 m²/g.

According to experimental and theoretical investigations by the inventors of this invention, when it is intended to hold a specific surface area of a sintered body to not smaller than 0.01 m²/g, if the density of the sintered body is smaller than 20% of its theoretical density, then its mechanical strength is too weak and even handling it with hands becomes difficult, and therefore, this range of density was determined to be unsuitable for practical use. Also, if the density of the sintered body was increased to larger than 80% of its theoretical density, then the specific surface area could not be made equal to or larger than 0.01 m²/g even with any process and even with any composition, and therefore, this range of density was also excluded. In addition, the upper limit of the specific surface area is suitably selected at 1 m²/g. This upper limit is attained from such degree of grain diameter that the surface of the porous sintered body may be made flat by a coating film formed upon anodizing the sintered body, and hence it is practically useless to reduce further the grain diameter for making the specific surface area larger than this upper limit value.

The term "density of a sintered body" as used herein means the quotient obtained by dividing a mass of a sintered body by its volume calculated from its external dimensions, whereas the term "theoretical density of a sintered body" as used herein means the quotient obtained by dividing a mass of a sintered body by its net volume excluding vacant hole portions.

The mixing proportions of titanium powder and aluminum powder in the case of producing the porous Ti-Al alloy according to the present invention are desirably selected in the ranges of $10 \sim 90$ atom.% for titanium and $90 \sim 10$ atom.% for aluminum. This is because if the proportion of either titanium or aluminum is extremely small, the merit obtained by mixing titanium and aluminum would be lost. The heat treatment of the mixed shaped body of titanium and aluminum powder is carried out within a vacuum or inert gas atmosphere in the temperature range lower than the melting point of aluminum but not lower than 500° C. for 5 minutes or more. It is to be noted that the upper limit of the period of heat treatment is the period up to the moment when diffusion of aluminum into the surface portions of the titanium grains terminates. This upper limit period is practically about 60 minutes, and even if the heat treatment is continued further for a longer period, substantially no change is found in the result of the heat treatment.

Furthermore, according to the present invention, the sintered body formed by press-shaping mixed powder of titanium and aluminum and heat-treating the shaped body in the temperature range lower than the melting point of aluminum but not lower than 500° C. (first heat-treatment) can have its mechanical strength enhanced without appreciably reducing its specific surface area by subsequently heat-treating again in the temperature range not lower than the melting point of aluminum (second heat-treatment). While this second heat-treatment must be carried out necessarily after the first heat-treatment, either the second heat-treatment could be carried out continuously after the first heat-treatment by raising the temperature or the sintered body could be once cooled after the first heat-treatment and subsequently subjected to the second heat-treatment. The second heat-treatment also should be necessarily carried out within a vacuum or inert gas atmosphere just like the first heat-treatment. Moreover, while it is only required to select the temperature of the second heat treatment at a temperature not lower than the melting point of aluminum, a temperature in the range of 700°~1300° C. is suitable, and the treatment period can be chosen in the range of 5 to 60 minutes.

DETAILED DESCRIPTION OF PREFERRED EMBODIMENTS

Aluminum powder of 200 meshes and titanium powder of 200 meshes were mixed in various proportions as indicated in TABLE-1, then press-shaped at a pressure of 1 ton/cm² and thereafter sintered under the different heat-treatment conditions as indicated in TABLE-1. In TABLE-1, "first heat-treatment" means a heat-treatment carried out at a temperature lower than the melting point of aluminum, whereas "second heat treatment" means a heat-treatment carried out at a temperature not lower than the melting point of aluminum. In the case of carrying out both the first heat-treatment and the second heat-treatment, they are to be carried out in the sequence of the first and second heat-treatments. In the preferred embodiments described hereunder, immediately after the first heat-treatment, the temperature was raised to a temperature not lower than the melting point of aluminum to continuously carry out the second heat-treatment.

TABLE 1

| Sample No. | Composition (at. %) Ti | A | First Heat-Treatment Temperature (°C.) | Period (Min.) | Second Heat-Treatment Temperature (°C.) | Period (Min.) |
|---|---|---|---|---|---|---|
| 1 | 90 | 10 | NOT CARRIED OUT | | 700 | 30 |
| 2 | 90 | 10 | " | | 1000 | 30 |
| 3 | 80 | 20 | " | | 700 | 30 |
| 4 | 80 | 20 | " | | 1000 | 30 |
| 5 | 70 | 30 | " | | 700 | 30 |
| 6 | 70 | 30 | " | | 1000 | 30 |
| 7 | 60 | 40 | " | | 700 | 30 |
| 8 | 60 | 40 | " | | 1000 | 30 |
| 9 | 50 | 50 | " | | 700 | 30 |
| 10 | 50 | 50 | " | | 1000 | 30 |
| 11 | 40 | 60 | " | | 700 | 30 |
| 12 | 40 | 60 | " | | 1000 | 30 |
| 13 | 30 | 70 | " | | 700 | 30 |
| 14 | 30 | 70 | " | | 1000 | 30 |
| 15 | 20 | 80 | " | | 700 | 30 |
| 16 | 20 | 80 | " | | 1000 | 30 |
| 17 | 10 | 90 | " | | 700 | 30 |
| 18 | 10 | 90 | " | | 1000 | 30 |
| 19 | 90 | 10 | 400 | 10⁵ | NOT CARRIED OUT | |
| 20 | 80 | 20 | 400 | 10⁵ | " | |
| 21 | 70 | 30 | 400 | 10⁵ | " | |
| 22 | 60 | 40 | 400 | 10⁵ | " | |
| 23 | 50 | 50 | 400 | 10⁵ | " | |
| 24 | 40 | 60 | 400 | 10⁵ | " | |
| 25 | 30 | 70 | 400 | 10⁵ | " | |
| 26 | 20 | 80 | 400 | 10⁵ | " | |
| 27 | 10 | 90 | 400 | 10⁵ | " | |
| 28 | 90 | 10 | 400 | 10⁵ | 700 | 30 |
| 29 | 90 | 10 | 400 | 10⁵ | 1000 | 30 |
| 30 | 80 | 20 | 400 | 10⁵ | 700 | 30 |
| 31 | 80 | 20 | 400 | 10⁵ | 1000 | 30 |
| 32 | 70 | 30 | 400 | 10⁵ | 700 | 30 |
| 33 | 70 | 30 | 400 | 10⁵ | 1000 | 30 |
| 34 | 60 | 40 | 400 | 10⁵ | 700 | 30 |
| 35 | 60 | 40 | 400 | 10⁵ | 1000 | 30 |
| 36 | 50 | 50 | 400 | 10⁵ | 700 | 30 |
| 37 | 50 | 50 | 400 | 10⁵ | 1000 | 30 |
| 38 | 40 | 60 | 400 | 10⁵ | 700 | 30 |
| 39 | 40 | 60 | 400 | 10⁵ | 1000 | 30 |
| 40 | 30 | 70 | 400 | 10⁵ | 700 | 30 |
| 41 | 30 | 70 | 400 | 10⁵ | 1000 | 30 |
| 42 | 20 | 80 | 400 | 10⁵ | 700 | 30 |
| 43 | 20 | 80 | 400 | 10⁵ | 1000 | 30 |
| 44 | 10 | 90 | 400 | 10⁵ | 700 | 30 |
| 45 | 10 | 90 | 400 | 10⁵ | 1000 | 30 |
| 46 | 90 | 10 | 500 | 60 | NOT CARRIED OUT | |
| 47 | 90 | 10 | 650 | 60 | " | |
| 48 | 80 | 20 | 500 | 60 | " | |
| 49 | 80 | 20 | 650 | 60 | " | |
| 50 | 70 | 30 | 500 | 60 | " | |
| 51 | 70 | 30 | 650 | 60 | " | |
| 52 | 60 | 40 | 500 | 60 | " | |
| 53 | 60 | 40 | 650 | 60 | " | |
| 54 | 50 | 50 | 500 | 60 | " | |
| 55 | 50 | 50 | 650 | 60 | " | |
| 56 | 40 | 60 | 500 | 60 | " | |
| 57 | 40 | 60 | 650 | 60 | " | |
| 58 | 30 | 70 | 500 | 60 | " | |
| 59 | 30 | 70 | 650 | 60 | " | |
| 60 | 20 | 80 | 500 | 60 | " | |
| 61 | 20 | 80 | 650 | 60 | " | |
| 62 | 10 | 90 | 500 | 60 | " | |
| 63 | 10 | 90 | 650 | 60 | " | |
| 64 | 90 | 10 | 500 | 5 | " | |
| 65 | 80 | 20 | 500 | 5 | " | |
| 66 | 70 | 30 | 500 | 5 | " | |
| 67 | 60 | 40 | 500 | 5 | " | |
| 68 | 50 | 50 | 500 | 5 | " | |
| 69 | 40 | 60 | 500 | 5 | " | |
| 70 | 30 | 70 | 500 | 5 | " | |
| 71 | 20 | 80 | 500 | 5 | " | |
| 72 | 10 | 90 | 500 | 5 | " | |
| 73 | 90 | 10 | 650 | 2 | " | |
| 74 | 80 | 20 | 650 | 2 | " | |
| 75 | 70 | 30 | 650 | 2 | " | |
| 76 | 60 | 40 | 650 | 2 | " | |
| 77 | 50 | 50 | 650 | 2 | " | |
| 78 | 40 | 60 | 650 | 2 | " | |
| 79 | 30 | 70 | 650 | 2 | " | |
| 80 | 20 | 80 | 650 | 2 | " | |
| 81 | 10 | 90 | 650 | 2 | " | |
| 82 | 90 | 10 | 650 | 2 | 700 | 30 |
| 83 | 80 | 20 | 650 | 2 | 700 | 30 |
| 84 | 70 | 30 | 650 | 2 | 700 | 30 |
| 85 | 60 | 40 | 650 | 2 | 700 | 30 |
| 86 | 50 | 50 | 650 | 2 | 700 | 30 |
| 87 | 40 | 60 | 650 | 2 | 700 | 30 |
| 88 | 30 | 70 | 650 | 2 | 700 | 30 |
| 89 | 20 | 80 | 650 | 2 | 700 | 30 |
| 90 | 10 | 90 | 650 | 2 | 700 | 30 |
| 91 | 90 | 10 | 500 | 5 | 1000 | 60 |
| 92 | 80 | 20 | 500 | 5 | 1000 | 60 |
| 93 | 70 | 30 | 500 | 5 | 1000 | 60 |
| 94 | 60 | 40 | 500 | 5 | 1000 | 60 |
| 95 | 50 | 50 | 500 | 5 | 1000 | 60 |
| 96 | 40 | 60 | 500 | 5 | 1000 | 60 |
| 97 | 30 | 70 | 500 | 5 | 1000 | 60 |
| 98 | 25 | 75 | 500 | 5 | 1000 | 60 |
| 99 | 90 | 10 | 600 | 30 | 1000 | 60 |
| 100 | 80 | 20 | 600 | 30 | 1000 | 60 |
| 101 | 70 | 30 | 600 | 30 | 1000 | 60 |
| 102 | 60 | 40 | 600 | 30 | 1000 | 60 |
| 103 | 50 | 50 | 600 | 30 | 1000 | 60 |
| 104 | 40 | 60 | 600 | 30 | 1000 | 60 |
| 105 | 30 | 70 | 600 | 30 | 1000 | 60 |
| 106 | 25 | 75 | 600 | 30 | 1000 | 60 |
| 107 | 90 | 10 | 600 | 30 | 1150 | 60 |
| 108 | 80 | 20 | 600 | 30 | 1150 | 60 |

TABLE 1-continued

| Sample No. | Composition (at. %) Ti | Composition (at. %) A | First Heat-Treatment Temperature (°C.) | First Heat-Treatment Period (Min.) | Second Heat-Treatment Temperature (°C.) | Second Heat-Treatment Period (Min.) |
| --- | --- | --- | --- | --- | --- | --- |
| 109 | 70 | 30 | 600 | 30 | 1150 | 60 |
| 110 | 60 | 40 | 600 | 30 | 1150 | 60 |
| 111 | 50 | 50 | 600 | 30 | 1150 | 60 |
| 112 | 40 | 60 | 600 | 30 | 1150 | 60 |
| 113 | 30 | 70 | 600 | 30 | 1150 | 60 |
| 114 | 25 | 75 | 600 | 30 | 1150 | 60 |
| 115 | 90 | 10 | 600 | 30 | 1300 | 60 |
| 116 | 80 | 20 | 600 | 30 | 1300 | 60 |
| 117 | 70 | 30 | 600 | 30 | 1300 | 60 |
| 118 | 60 | 40 | 600 | 30 | 1300 | 60 |
| 119 | 50 | 50 | 600 | 30 | 1300 | 60 |
| 120 | 40 | 60 | 600 | 30 | 1300 | 60 |
| 121 | 30 | 70 | 600 | 30 | 1300 | 60 |
| 122 | 25 | 75 | 600 | 30 | 1300 | 60 |

When the sintered bodies produced under the various conditions as indicated in TABLE-1 above were measured, the results shown in TABLE-2 were obtained. It is to be noted that in TABLE-2 the mechanical strength is represented in terms of a breakdown pressure in a pressure breakingdown test.

TABLE 2

| Sample No. | Specific Surface Area (m$^2$/g) | Density of a Sintered Body (%) | Mechanical Strength (Kg/cm$^2$) |
| --- | --- | --- | --- |
| 1 ~ 10 | 0.005 or less | 70 ~ 90 | 500 or more |
| 19 ~ 27 | 0.005 or less | 40 ~ 70 | 100 or less |
| 28 ~ 45 | 0.005 or less | 70 ~ 90 | 500 or more |
| 46 ~ 63 | 0.5 ~ 2 | 25 ~ 70 | 100 ~ 1500 |
| 64 ~ 72 | 0.5 ~ 2 | 25 ~ 70 | 100 ~ 1500 |
| 73 ~ 81 | 0.005 or less | 40 ~ 70 | 100 or less |
| 82 ~ 90 | 0.005 or less | 70 ~ 80 | 500 or more |
| 91 ~ 98 | 0.3 ~ 1.8 | 28 ~ 73 | 200 ~ 2200 |
| 99 ~ 106 | 0.3 ~ 1.8 | 28 ~ 73 | 200 ~ 2200 |
| 107 ~ 114 | 0.05 ~ 1 | 35 ~ 78 | 300 ~ 3000 |
| 115 ~ 122 | 0.005 or less | 65 ~ 90 | 500 or more |

From the above-indicated experimental data, the following facts will become apparent. At first, it will be appreciated that if the heat-treatment at the temperature not lower than the melting point (about 665° C.) of aluminum (that is, the second heat-treatment) is carried out initially without carrying out the heat-treatment at the temperature lower than the melting point of aluminum (that is, the first heat-treatment), then even during a heat-treatment period of only 30 minutes the specific surface area is greatly lost. This is surmized to be caused by melting of aluminum.

Next, it is found that when carrying out only the heat-treatment at the temperature lower than the melting point of aluminum, if it is carried out at too low a temperature (such as about 400° C.) the reaction does not proceed appreciably. And even after applying the heat-treatment for a period of 10$^5$ minutes, the state of the body is not appreciably different from the state just after the press-shaping, and the specific surface area and the mechanical strength are both small. Furthermore, if the temperature is raised up to a temperature not lower than the melting point of aluminum to carry out the second heat-treatment after such a first heat-treatment at a too low temperature, then the specific surface area is also greatly reduced due to the fact that the remaining aluminum is molten.

However, if the first heat-treatment is carried out under the conditions selected according to the present invention, that is, in the temperature range lower than the melting point of aluminum but not lower than 500° C., then one can obtain a desired sintered body having a large specific surface area as well as a certain amount of mechanical strength. And in this case, as distinguished from the aforementioned case where the temperature of the first heat-treatment is too low and hence aluminum remains in the body, it is possible to additionally carry out the second heat-treatment.

Accordingly, from the above-described experimental results, it is seen that the heat-treatment in the temperature range lower than the melting point of aluminum but not lower than 500° C. is essentially necessary for obtaining a porous Ti-Al alloy according to the present invention which has a large specific surface area and a large mechanical strength.

In the above-described temperature range, it seems that the alloying reaction proceeds in the form of diffusion of aluminum into titanium, the portions in which aluminum was originally present become vacant holes, and as a result, a large specific surface area larger than 0.01 m$^2$/g can be realized.

Upon this heat-treatment, even if the heat-treatment temperature is held at the proper temperature lower than the melting point of aluminum but not lower than 500° C., as shown by the group of samples Nos. 73 to 81, in the case of a first heat-treatment period less than 5 minutes, the alloying reaction does not fully proceed and thus it is impossible to obtain a large specific surface area. Moreover, if the temperature is thereafter raised up to a temperature not lower than the melting point of aluminum (i.e. a second heat-treatment is applied), then also a large specific surface area cannot be obtained as shown by the group consisting of the samples Nos. 82 to 90 due to the fact that the unreacted aluminum is molten.

However, in the case where the first heat-treatment has been carried out in a range lower than the melting point of aluminum but not lower than 500° C. for a period of 5 minutes or more, since most of the aluminum is alloyed in this step of the method, as shown by the group of samples Nos. 91 to 98, marked reduction of the specific surface area caused by melting of aluminum does not occur even if a second heat-treatment is carried out thereafter at a temperature not lower than the melting point of aluminum as the second heat-treatment. Merely gradual reduction of the specific surface area and gradual increase of the density would occur as the normal sintering process proceeds. Accordingly, if it is desired to further enhance the mechanical strength of the sintered body, after the temperature has been held in the temperature range lower than the melting point of aluminum but not lower than 500° C. for 5 minutes or more (first heat-treatment), it is only necessary to make the sintering proceed appropriately as by further raising the temperature (i.e. to a second heat-treatment). However, in such case as the sintering proceeds the density of the sintered body is increased and at the same time the specific surface area is reduced, so that preliminarily a sufficient attention should be paid to the limit of the proceeding of the sintering.

However, even if it is assumed that the pressing force upon press-shaping was selected at the lowest limit value that can shape the body, provided that the heat-treatment is carried out according to the present invention, a sintered body having a small density and an extremely large specific surface area can be obtained. However, in such a case, mechanical strength comes into question and a sintered body having a density smaller than 20% of the theoretical density cannot withstand practical uses. On the other hand, if the density of the sintered body exceeds 80% of its theoretical density, then whatever the proportion between titanium and aluminum in the mixed and pressed power body may be, the resulting specific surface area will be smaller than 0.01 m$^2$/g, and therefore, such a sintered body is also unsuitable. Accordingly, with regard to the density of the porous Ti-Al alloy according to the present invention, it should be suitably be selected to be in the range of 20 to 80% of its theoretical density.

Next examples of applications of the present invention are described.

A Ti-Al alloy electrolytic capacitor having a virtual anode volume of 0.02 cm$^3$ was produced under the same conditions as the groups of samples Nos. 46 to 72 and samples Nos. 91 to 114 in the above-described preferred embodiments of the present invention, and it was compared with the conventional Ta electrolytic capacitor. This proved that an excellent Ti-Al alloy electrolytic capacitor can be obtained having a capacitance that is 2-5 times as large as that of a conventional Ta electrolytic capacitor of equivalent weight.

Furthermore, measuring the electric characteristics such as leakage current, and dielectric loss of these Ti-Al alloy electrolytic capacitors, excellent results as shown in TABLE-3 were obtained. These experimental results are substantially equivalent to the value of the leakage current and dielectric loss of the Ta electrolytic capacitors, and hence these results are excellent as capacitor characteristics.

TABLE 3

| Sample No. | Leakage Current ($\mu$A/$\mu$F V) | Dielectric Loss (%) |
| --- | --- | --- |
| 47 | 0.11 | 6.5 |
| 49 | 0.092 | 4.3 |
| 51 | 0.051 | 3.6 |
| 53 | 0.023 | 3.1 |
| 55 | 0.0090 | 2.3 |
| 57 | 0.0049 | 2.2 |
| 59 | 0.0061 | 2.3 |
| 61 | 0.0064 | 2.2 |
| 63 | 0.0058 | 2.2 |
| 91 | 0.019 | 6.1 |
| 92 | 0.010 | 4.0 |
| 93 | 0.0089 | 2.6 |
| 94 | 0.0037 | 1.9 |
| 95 | 0.0015 | 1.5 |
| 96 | 0.0019 | 1.6 |
| 97 | 0.0021 | 1.9 |
| 98 | 0.0025 | 2.1 |
| 99 | 0.018 | 5.9 |
| 100 | 0.017 | 4.0 |
| 101 | 0.0085 | 2.3 |
| 102 | 0.0037 | 1.8 |
| 103 | 0.0013 | 1.5 |
| 104 | 0.0020 | 1.6 |
| 105 | 0.0020 | 1.9 |
| 106 | 0.0024 | 2.1 |
| 107 | 0.015 | 5.7 |
| 108 | 0.0095 | 3.6 |
| 109 | 0.0053 | 1.8 |
| 110 | 0.0021 | 1.5 |
| 111 | 0.0010 | 1.4 |
| 112 | 0.0012 | 1.6 |
| 113 | 0.0013 | 1.8 |
| 114 | 0.0015 | 2.0 |

Also a catalyzer structure of cylindrical filter type of 50 mm in diameter and 200 mm in length was produced under the same conditions as the group of samples Nos. 52 to 57 in the above-described preferred embodiments of the present invention. The catalyzer structure was inserted into a glass tube having an inner diameter of 50 mm, nitrogen oxides were made to flow through the glass tube from one of its ends while maintaining the entire system at 450° C., and the gas flowing out of the other end of the glass tube was analyzed with a gas chromatograph. All the out-flow gas had been decomposed into oxygen and nitrogen, and no nitrogen oxides were detected.

In addition, a disc-shaped filter of 200 mm in diameter and 50 mm in thickness was produced under the same conditions as the group of samples Nos. 99 to 106 in the above-described preferred embodiments of the present invention. Gasoline containing microfine powder of metal oxides having particle diameters of 0.5 $\mu$m or smaller as an impurity at a rate of 0.1 mg/l was passed through the filter at a flow rate of 100 l/hr. No impurity was detected in the gasoline having passed through the filter. Furthermore, when gasoline was passed through the filter for 500 hours under the same condition, no lowering of the filtering capability of the filter was observed, and there was no brittling of the filter caused by corrosion or the like.

As described in detail above, porous Ti-Al alloy according to the present invention is available for many purposes such as capacitor anode bodies, catalyzers, filters, etc., and the resulting various application products also have excellent characteristics and are cheap in cost.

Still further, the method for producing a porous Ti-Al alloy according to the present invention has the advantage that many kinds of products having various shapes can be produced reliably, easily and at low cost.

What is claimed is:

1. A porous sintered body of Ti-Al alloy consisting of titanium and aluminum, said alloy body having a density equal to 20 to 80% of its theoretical density, a specific surface area of 0.01 m$^2$/g or more, and pores in said porous body being essentially vacant voids from which aluminum has been diffused into titanium particles.

2. A method for producing a porous sintered body of Ti-Al alloy comprising the steps of mixing titanium powder and aluminum powder, press-shaping the mixture into a body, and heating the shaped body at a temperature lower than the melting point of aluminum but not lower than 500° C. in a vacuum or inert gas atmosphere.

3. A method for producing a porous sintered body of Ti-Al alloy as claimed in claim 2, in which the heating step is carried out for 5 to 60 minutes.

4. A method for producing a porous sintered body of Ti-Al alloy comprising the steps of mixing titanium powder and aluminum powder, press-shaping the mixture into a body, heating the shaped body in a first heat-treatment step at a temperature lower than the melting point of aluminum but not lower than 500° C. within a vacuum or inert gas atmosphere, and thereafter heating said shaped body in a second heat-treatment step at a temperature equal to or higher than the melting point of aluminum.

5. A method for producing a porous sintered body of Ti-Al alloy as claimed in claim 4, in which the second heat-treatment step is carried out in the temperature range between the melting point of aluminum and 1300° C.

6. A method for producing a porous sintered body of Ti-Al alloy as claimed in claim 4, in which the first heat-treatment step is carried out for 5 to 60 minutes.

7. A porous sintered body of Ti-Al alloy as defined in claim 1, further characterized in that the specific surface area of said alloy body is not more than 1 m²/g.

8. A porous sintered body of Ti-Al alloy as defined in claim 1, further characterized in that the relative proportions of titanium and aluminum in said alloy body are in the ranges of 10 to 90 atom. % for titanium and 90 to 10 atom. % for aluminum.

9. A method for producing a porous sintered body of Ti-Al alloy as defined in claim 6, in which the second heat-treatment step is carried out for 5 to 60 minutes.

10. A method for producing a porous sintered body of Ti-Al alloy as defined in claim 2 or 4, in which said mixing step further comprises the mixing of titanium and aluminum powders in the relative proportions of 10 to 90 atom. % for titanium and 90 to 10 atom. % for aluminum.

11. A method for producing a porous sintered body of Ti-Al alloy as defined in claim 4, in which the second heat-treatment is carried out immediately after the first heat-treatment by raising the temperature from lower than the melting point of aluminum to higher than the melting point of aluminum.

12. A method for producing a porous sintered body of Ti-Al alloy as defined in claim 3, in which the heating step is carried out at a temperature of 500° C. for 60 minutes.

13. A method for producing a porous sintered body of Ti-Al alloy as defined in claim 3, in which the heating step is carried out at a temperature of 650° C. for 60 minutes.

14. A method for producing a porous sintered body of Ti-Al alloy as defined in claim 3, in which the heating step is carried out at a temperature of 500° C. for 5 minutes.

15. A method for producing a porous sintered body of Ti-Al alloy as defined in claim 9, in which the first heat-treatment step is carried out at a temperature of 500° C. for 5 minutes and in which the second heat-treatment step is carried out at a temperature of 1000° C. for 60 minutes.

16. A method for producing a porous sintered body of Ti-Al alloy as defined in claim 9, in which the first heat-treatment step is carried out at a temperature of 600° C. for 30 minutes and in which the second heat-treatment step is carried out at a temperature of 1000° C. for 60 minutes.

17. A method for producing a porous sintered body of Ti-Al alloy as defined in claim 9, in which the first heat-treatment step is carried out at a temperature of 600° C. for 30 minutes and in which the second heat-treatment step is carried out at a temperature of 1150° C. for 60 minutes.

18. A method for producing a porous sintered body of Ti-Al alloy comprising the steps of mixing titanium powder and aluminum powder, press-shaping the mixture into a body, and heating the shaped body without melting at a temperature which causes an alloying reaction to take place in which aluminum diffusion is predominant and in which vacant holes are left where the aluminum grains were, thereby resulting in a porous body having a specific surface area of 0.01 to 1 m²/g and a density of 20 to 80% of its theoretical density.

* * * * *

UNITED STATES PATENT AND TRADEMARK OFFICE
CERTIFICATE OF CORRECTION

PATENT NO. : 4,331,477

DATED : May 25, 1982

INVENTOR(S) : Yoshimi Kubo and Hitoshi Igarashi

It is certified that error appears in the above-identified patent and that said Letters Patent is hereby corrected as shown below:

Column 7, line 31 (Table 2), "1-10" to read
-- 1-18 --.

Signed and Sealed this

Twenty-first Day of September 1982

[SEAL]

Attest:

GERALD J. MOSSINGHOFF

Attesting Officer

Commissioner of Patents and Trademarks